US010823093B2

(12) United States Patent
Kelly et al.

(10) Patent No.: US 10,823,093 B2
(45) Date of Patent: Nov. 3, 2020

(54) METHOD AND SYSTEM FOR VARIABLE DISPLACEMENT ENGINES

(71) Applicant: Ford Global Technologies, LLC, Dearborn, MI (US)

(72) Inventors: Tyler Kelly, Plymouth, MI (US); Adam Krach, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/365,285

(22) Filed: Mar. 26, 2019

(65) Prior Publication Data

US 2020/0309051 A1 Oct. 1, 2020

(51) Int. Cl.
*F02D 41/22* (2006.01)
*F02D 41/00* (2006.01)
*G01M 15/09* (2006.01)
*F01L 13/00* (2006.01)

(52) U.S. Cl.
CPC ....... *F02D 41/0087* (2013.01); *F02D 41/221* (2013.01); *G01M 15/09* (2013.01); *F01L 13/0005* (2013.01); *F01L 2800/00* (2013.01); *F02D 2041/0012* (2013.01); *F02D 2200/0406* (2013.01)

(58) Field of Classification Search
CPC ............... F02D 41/0087; F02D 41/221; F02D 2200/0406; F02D 2041/0012; G01M 15/09; F01L 13/0005; F01L 2800/00
USPC ...... 123/90.15, 198 F, 481, 198 D, 345–348; 701/103, 107, 110, 112; 73/114.69
See application file for complete search history.

(56) References Cited

U.S. PATENT DOCUMENTS

| | | | |
|---|---|---|---|
| 7,194,993 B2 | 3/2007 | Lewis et al. | |
| 7,204,132 B2 | 4/2007 | Reed et al. | |
| 7,546,827 B1 | 6/2009 | Wade et al. | |
| 7,555,896 B2 | 7/2009 | Lewis et al. | |
| 7,707,977 B2 * | 5/2010 | Mutti | F01L 9/02 123/90.15 |
| 7,757,657 B2 * | 7/2010 | Albertson | F02D 17/02 123/198 F |
| 7,762,237 B2 * | 7/2010 | Gibson | F01L 1/34 123/198 F |
| 7,900,509 B2 * | 3/2011 | Feldkamp | G01M 15/042 73/114.79 |
| 7,921,709 B2 | 4/2011 | Doering et al. | |
| 8,006,670 B2 * | 8/2011 | Rollinger | F02D 17/02 123/198 F |

(Continued)

OTHER PUBLICATIONS

Kelly, T. et al., "Method and System for Cylinder Imbalance Detection," U.S. Appl. No. 16/405,939, filed May 7, 2019, 48 pages.

*Primary Examiner* — Hai H Huynh
(74) *Attorney, Agent, or Firm* — Geoffrey Brumbaugh; McCoy Russell LLP

(57) ABSTRACT

Methods and systems are provided for diagnosing valve operation during a cylinder deactivation event in a variable displacement engine. Crankshaft acceleration data is captured during an exhaust stroke of a deactivated cylinder and compared to a calibrated map of crankshaft acceleration data for the given cylinder. Based on the comparison, it may be indicated that the deactivation of the exhaust valve of the given cylinder is degraded, and that the exhaust valve is open when commanded closed.

20 Claims, 7 Drawing Sheets

(56) References Cited

U.S. PATENT DOCUMENTS

| | | | | |
|---|---|---|---|---|
| 8,286,471 B2* | 10/2012 | Doering | ............. | F01L 13/00 |
| | | | | 73/114.79 |
| 8,826,891 B2* | 9/2014 | Nishikiori | ............. | F02D 13/06 |
| | | | | 123/198 F |
| 9,562,470 B2* | 2/2017 | Younkins | ............. | F02B 77/082 |
| 9,650,977 B2 | 5/2017 | Martin et al. | | |
| 9,890,732 B2* | 2/2018 | Younkins | ............. | F02D 41/221 |
| 2010/0154738 A1* | 6/2010 | Tsukamoto | ............. | F02D 17/02 |
| | | | | 123/198 F |
| 2012/0173122 A1* | 7/2012 | Nishikiori | ............. | F02D 9/06 |
| | | | | 701/103 |
| 2013/0325290 A1* | 12/2013 | Pierik | ............. | F01L 3/24 |
| | | | | 701/102 |
| 2016/0024981 A1* | 1/2016 | Parsels | ............. | F02D 41/0087 |
| | | | | 123/90.11 |

* cited by examiner

| Z = cylinder 1 faulted exhaust acceleration | Low load | Medium load | High load |
|---|---|---|---|
| Low speed | -0.3 | -0.35 | -0.5 |
| Medium speed | -0.2 | -0.35 | -0.45 |
| High speed | -0.2 | -0.35 | -0.45 |

FIG. 7

METHOD AND SYSTEM FOR VARIABLE DISPLACEMENT ENGINES

FIELD

The present description relates generally to methods and systems for identifying and addressing degradation of an exhaust valve deactivation mechanism in a variable displacement engine.

BACKGROUND/SUMMARY

Some engines, known as variable displacement engines (VDE), may be configured to operate with a variable number of active and deactivated cylinders to increase fuel economy, while optionally maintaining the overall exhaust mixture air-fuel ratio about stoichiometry. Therein, a portion of the engine's cylinders may be disabled during selected conditions defined by parameters such as a speed/load window, as well as various other operating conditions including engine temperature and vehicle speed. A VDE control system may disable selected cylinders through the control of a plurality of cylinder valve deactivators that affect the operation of the cylinder's intake and exhaust valves. Additionally or optionally, fueling of the selected cylinders may be disabled through the control of a plurality of selectively deactivatable fuel injectors.

Various approaches have been developed for diagnosing degradation in VDE operation due to degradation of cylinder valve operation. For example, diagnostic routines may identify if an intake or exhaust valve closed when commanded to close, or remained open. Likewise, the diagnostic routines may identify if an intake or exhaust valve opened when commanded open, or remained closed. One example approach for diagnosing a cylinder valve deactivation mechanism of a variable displacement engine is shown by Lewis et al. in U.S. Pat. No. 7,555,896. Therein valve degradation is identified via multiple approaches including valve position measurements, temperature measurements, engine speed measurements, and current/voltage measurements. In another approach shown by Wade et al in U.S. Pat. No. 7,546,827, degradation is identified based on a combination of sensed valve position and sensed engine position.

However, the inventors herein have recognized potential issues with such systems. As one example, it may be costly to implement valve position sensors on VDE systems. As another example, current and voltage sensors may only be available on more costly electro-mechanical VDE systems and may not be applicable for hydraulic VDE systems. As such, if degradation of the valve deactivation mechanism is not identified and addressed in a timely manner, tailpipe emissions may be affected. For example, when cylinder deactivation is active in an engine, the exhaust valve of the deactivated cylinder remains closed for the duration of the cylinder's deactivation. If the actuator coupled to the exhaust valve deactivation mechanism is degraded, the exhaust valve may continue to open even when the cylinder is deactivated. This can result in an increase in tailpipe emissions due to oil being pulled past the piston rings during an exhaust stroke of the deactivated cylinder. In addition, the increased oil consumption may reduce engine life.

In one example, the issues described above may be addressed by a method for a variable displacement engine comprising indicating degradation of an exhaust valve of a selectively deactivated engine cylinder responsive to crankshaft acceleration sensed over an exhaust stroke of the cylinder. In this way, degradation of cylinder valve deactivation mechanisms may be timely identified and addressed.

As one example, responsive to a drop in torque demand, one or more cylinders may be selectively deactivated by disabling corresponding fuel injectors and deactivating corresponding intake and exhaust valves. While the cylinder is deactivated, crank position data may be collected at a defined sampling rate (e.g., at ~8 MHz) from a crank position sensor, specifically during an exhaust stroke of the deactivated cylinder(s). As such, the crank position sensor may be an existing sensor of the engine system, used for engine speed and acceleration measurements during engine control. The exhaust stroke acceleration data for each deactivated cylinder may then be compared to a 3D map for the corresponding cylinder, the 3-D map generated during a calibration procedure. The map may include data stored as a function of engine speed and load, and may correspond to a faulted exhaust valve cylinder, that is, a cylinder that is open when commanded closed on a cylinder deactivation event. If a difference between the measured exhaust acceleration for the deactivated cylinder and the mapped exhaust acceleration for the given cylinder (for the given engine speed and load) is higher than a threshold, then the output of a fault counter for the given cylinder may be incremented. Once the output of the fault counter exceeds a threshold count, a diagnostic code may be set indicating exhaust valve degradation in the selectively deactivated cylinder. In one example, the exhaust acceleration data may be collected and compared over multiple cylinder deactivation events of a drive cycle. Responsive to the indication of degradation, further deactivation of the selected cylinder may be temporarily disabled.

In this way, an existing crank position sensor can be used to identify degradation of an exhaust valve deactivation mechanism, reducing cost and complexity of the diagnostic. In addition, reliance on new and expensive exhaust pressure sensors, valve position sensors, or voltage and current sensors is reduced. By improving the timely identification of exhaust valve degradation, tailpipe emissions may be improved. In addition, warranty issues may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows an example look-up table of engine speed versus engine load data for a cylinder having faulted exhaust acceleration due to degradation of a cylinder exhaust valve deactivation mechanism.

DETAILED DESCRIPTION

Figure 1:
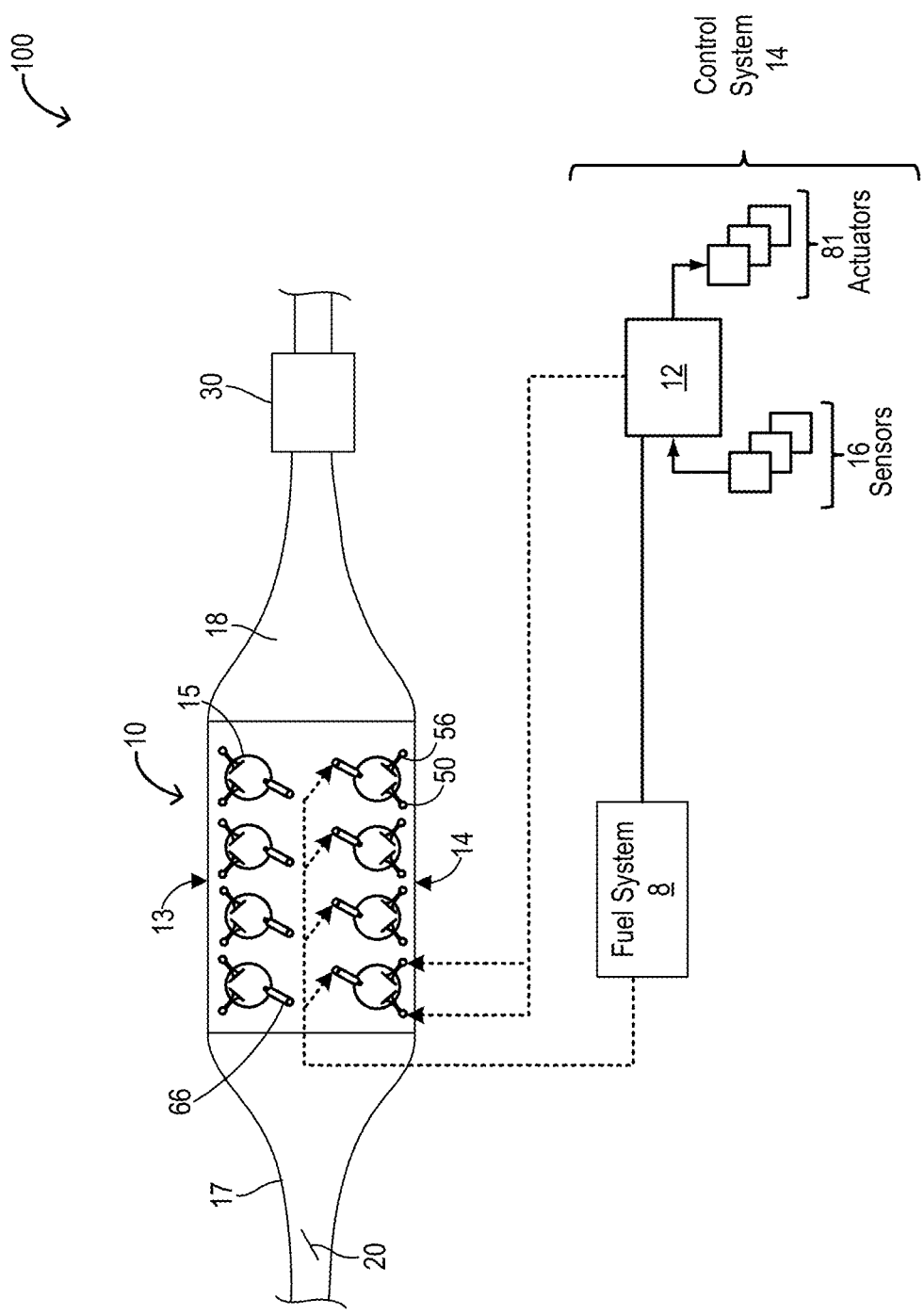
FIG. 1 shows a schematic depiction of an example engine system including selectively deactivatable engine cylinders.
Figure 2:
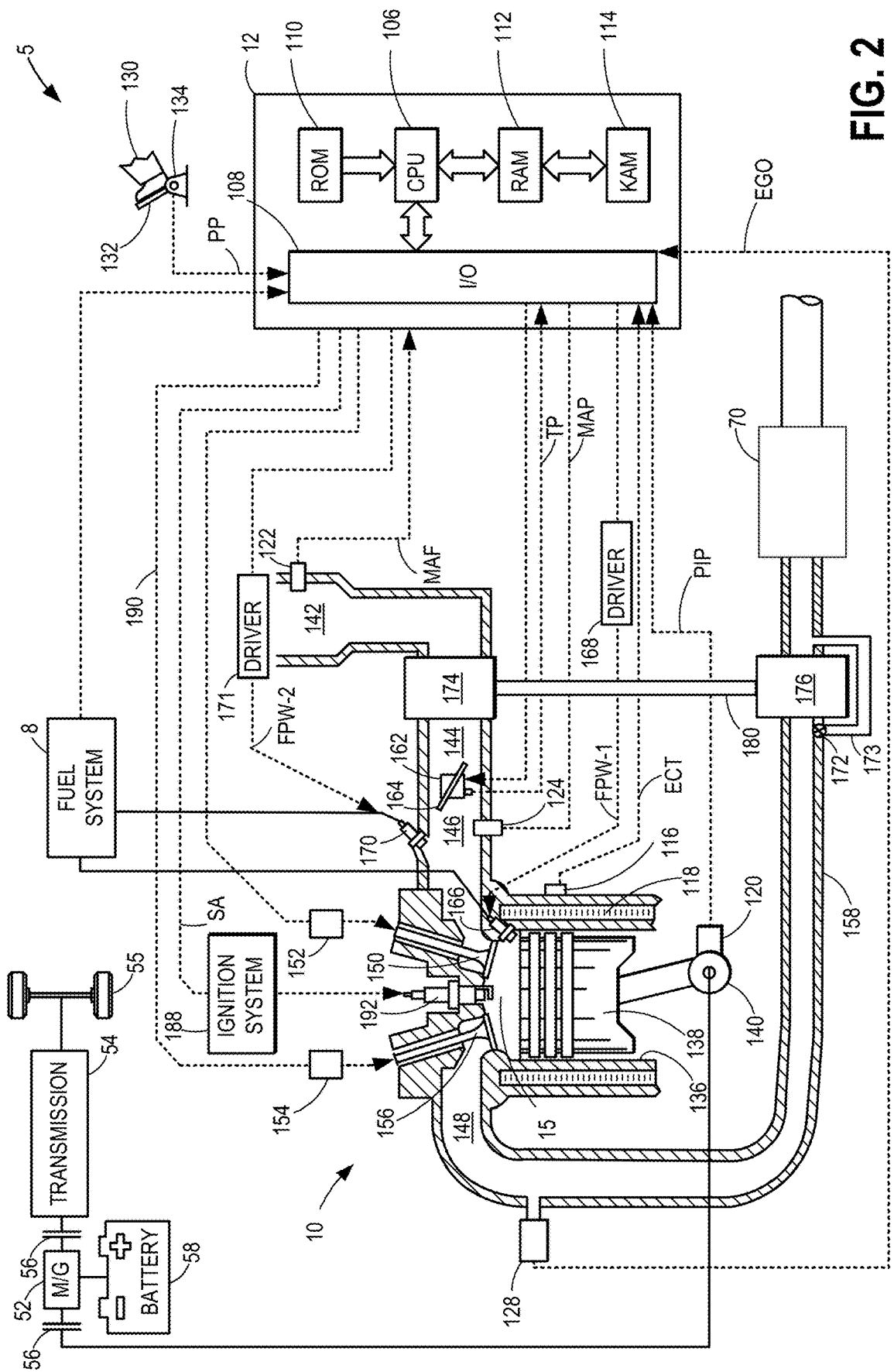
FIG. 2 shows a schematic diagram of a vehicle system that includes the engine system of FIG. 1.

The following description relates to systems and methods for diagnosing cylinder valve operation in an engine configured with selectively deactivatable cylinders, such as the engine system of FIG. 1 coupled in the vehicle system of FIG. 2. An engine controller may be configured to perform a control routine, such as the example routine of FIG. 3, to disable cylinder fueling responsive to cylinder deactivation conditions being met and diagnose the function of a cylinder exhaust valve during the deactivation based on crankshaft acceleration measured during an exhaust stroke of the deactivated cylinder. The crankshaft acceleration sensed during an exhaust stroke of the deactivated cylinder may be compared to a mapped value, generated during a calibration routine depicted at FIG. 5. During the calibration, crankshaft acceleration may be captured for each cylinder over a range of engine speeds and loads with the exhaust valve commanded open and closed. A comparison of the acceleration values collected during the calibration is used to populate a map or look-up table, such as the table of FIG. 7, which is then referred to during the diagnostic routine of FIG. 3. In this way, cylinder valves of a VDE engine are reliably diagnosed allowing fuel economy and emissions compliance to both be achieved.

Turning now to FIG. 1, an example engine system 100 is shown. Engine system 100 includes an engine 10 having a first cylinder bank 13 and a second cylinder bank 14. In the depicted example, engine 10 is a V-8 engine with two cylinder banks, each having four cylinders 15. However in alternate examples, the engine may have an alternate configuration, such as an alternate number of cylinders (e.g., V-4, V-6, etc.), or an in-line arrangement of cylinders (e.g., I-3, I-4, etc.). Engine 10 has an intake manifold 17, with intake throttle 20, and an exhaust manifold 18 coupled to an emission control system 30. Emission control system 30 includes one or more catalysts and air-fuel ratio sensors, such as described with regard to FIG. 2. Engine 10 may operate on a plurality of substances, which may be delivered via fuel system 8. As one non-limiting example, engine 10 can be included as part of a propulsion system for a passenger vehicle, such as the vehicle system of FIG. 2.

Engine 10 may be a variable displacement engine (VDE), having one or more cylinders 14 with selectively deactivatable (direct) fuel injectors 66. Therein, selected cylinders may be deactivated by shutting off the respective fuel injectors and disabling spark delivery. Fueling may be deactivated while maintaining operation of cylinder intake and exhaust valves such that air may continue to be pumped through the cylinders. This process may be referred to herein as a deceleration fuel shut-off (or cut-off) event, or simply DFSO.

In some examples, one or more of the cylinders 15 may also be configured with selectively deactivatable intake valves 50 and selectively deactivatable exhaust valves 56. Therein, selected cylinders may be deactivated by shutting off the respective cylinder valves, by a process referred to herein as a deceleration cylinder cut-off event, or simply DCCO. In one example, intake valves 50 and exhaust valves 56 are configured for electric valve actuation (EVA) via electric individual cylinder valve actuators. In other examples, the intake and exhaust valves may be cam-actuated. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). This may include selectively deactivating one or more cylinders on the first cylinder bank 13, and/or selectively deactivating one or more cylinders on the second cylinder bank 14. The number and identity of cylinders deactivated on the cylinder bank may be symmetrical or asymmetrical. An engine controller 12 may continually analyze individual cylinders, determining whether to activate or deactivate each cylinder based on a driver's pedal position input and torque demands. In still other examples, entire banks or subsets of cylinders may be deactivated.

During the deactivation, selected cylinders may be deactivated by disabling cylinder fueling while also disabling air from being pumped through the deactivated cylinders by closing at least the cylinder exhaust valve. As a result, the cylinder exhaust valve remains closed on an exhaust stroke of the cylinder deactivation event. In addition to stopping fuel flow to the deactivated cylinders, spark to the deactivated cylinders may also be stopped, such as by selectively controlling the vehicle ignition system to only deliver spark to active cylinders. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder.

While the selected cylinders are disabled, the remaining enabled or active cylinders continue to carry out combustion with fuel injectors 66 and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders 15 may be deactivated to provide a specific firing pattern based on a designated control algorithm. More specifically, selected "skipped" cylinders are not fired while other "active" cylinders are fired. Optionally, a spark timing associated with a selected firing of a selected working chamber may also be adjusted based on a firing order or firing history of the selected working chamber. As used herein, the firing pattern or deactivation pattern may include a total number of deactivated cylinders relative to remaining active cylinders, as well as an identity of the deactivated and active cylinders. The firing pattern may further specify a total number of combustion events for which each deactivated cylinder is held deactivated, and/or a number of engine cycles over which the pattern is operated. The engine controller 12 may be configured with suitable logic, as described below, for determining a cylinder deactivation (or skip-firing) pattern based on engine operating conditions. For example, the controller may select a desired induction ratio to apply based on engine operating parameters, including operator torque demand, and then select a cylinder deactivation pattern that enables the desired induction ratio to be provided. As used herein, the induction ratio is defined as the number of actual cylinder induction events (e.g., cylinders firing) that occur divided by the number of cylinder induction event opportunities (e.g., total engine cylinders). The cylinder pattern may be selected based on the configuration of the engine, such as based on whether the engine is a V-engine, an in-line engine, the number of engine cylinders present in the engine, etc. Based on the selected cylinder pattern, the individual cylinder valve mechanisms of the selected cylinders may be closed while fuel flow and spark to the cylinders are stopped, thereby enabling the desired induction ratio to be provided. For example, when operating in a VDE mode with cylinder deactivation, half of the total number of engine cylinders may be selectively deactivated. As another example, one bank of cylinders may be deactivated while the other bank remains active. In this way, by adjusting the cylinder pattern of individual cylinder valve mechanisms and individual cylinder fuel injectors, a desired engine output can be provided by operating fewer cylinders more efficiently, thereby improving fuel economy.

Engine 10 may be controlled at least partially by a control system 14 including controller 12. Controller 12 may receive various signals from sensors 16 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of throttle position from a throttle position sensor.

Turning now to FIG. 2, it schematically illustrates one cylinder of a multi-cylinder engine 10, which may be included in a propulsion system of a vehicle system 5. In one example, engine 10 is the variable displacement engine 10 of FIG. 1. Components previously introduced may be similarly numbered.

In some examples, vehicle system 5 may be a hybrid vehicle with multiple sources of torque available to one or more vehicle wheels 55. In other examples, vehicle system 5 is a conventional vehicle with only an engine, or an electric vehicle with only electric machine(s). In the example shown, vehicle system 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (e.g., cylinder) 15 of engine 10 may include combustion chamber walls 136 with piston 138 positioned therein. In some embodiments, the face of piston 138 inside cylinder 15 may have a bowl. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor (not shown) may be coupled to crankshaft 140 via a flywheel to enable a starting operation of engine 10.

Combustion chamber 15 may receive intake air from intake manifold 146 via intake passages 142 and 144, and may exhaust combustion gases via exhaust manifold 148. In this way, intake passages 142 and 144 are fluidically coupled to intake manifold 146. Intake manifold 146 and exhaust manifold 148 can selectively communicate with combustion chamber 14 via a respective intake valve 150 and exhaust valve 156. In some embodiments, combustion chamber 15 may include two or more intake valves and/or two or more exhaust valves.

Intake valve 150 and exhaust valve 156 may be controlled by controller 12 via respective electric variable valve actuators 152 and 154. Alternatively, the variable valve actuators 152 and 154 may be electro-hydraulic, cam actuated, or any other conceivable mechanism to enable valve actuation. During some conditions, controller 12 may vary the signals provided to the variable valve actuators to control the opening and closing of the respective intake and exhaust valves. The position of intake valve 150 and exhaust valve 156 may be determined by respective valve position sensors (not shown). In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 15 may alternatively include an intake valve controlled via electric valve actuation and an exhaust valve controlled via cam actuation including CPS and/or VCT.

Fuel injector 166 is shown coupled directly to combustion chamber 15 for injecting fuel directly therein in proportion to the pulse width of signal FPW-1 received from controller 12 via electronic driver 168. In this manner, fuel injector 166 provides what is known as direct injection of fuel into combustion chamber 15. It will be appreciated that the fuel injector may be mounted in the side of the combustion chamber or in the top of the combustion chamber, for example.

Fuel injector 170 is shown coupled directly to intake manifold 146 for injecting fuel directly therein in proportion to the pulse width of signal FPW-2 received from controller 12 via electronic driver 171. In this manner, fuel injector 170 provides what is known as port injection of fuel into intake manifold 146. Fuel may be delivered to fuel injector 166 and 170 by a fuel system 8 that may include a fuel tank, a fuel pump, and a fuel rail. It will be appreciated that engine 10 may include one or more of port fuel injection and direct injection.

As previously mentioned, some engine embodiments may include operating the engine with one or more cylinders deactivated, in a variable displacement engine (VDE) mode to increase fuel economy. When the engine is operated in the VDE mode, selected engine cylinders are operated without fuel injection while remaining cylinders continues to operate. Specifically, fuel injection via fuel injector 166 and/or fuel injector 170 to one or more cylinders 15 is selectively disabled. In addition air flow through the selected cylinders is also disabled by deactivating corresponding cylinder intake and exhaust valve mechanisms. VDE entry conditions may be based on a plurality of vehicle and engine operating conditions. In particular, a combination of one or more of vehicle speed, vehicle acceleration, engine speed, engine load, throttle position, pedal position, transmission gear position, and various other parameters may be used to determine whether the engine will be entering VDE mode. In one example, VDE entry conditions may be met where selected engine cylinders are deactivated, such as when the vehicle is decelerating (e.g., vehicle speed is decreasing), when engine speed or load is below a threshold, or based on an accelerator pedal position that indicates no torque is being requested. For example, during a tip-out where an operator releases the accelerator pedal (e.g., input device 132), cylinder deactivation entry conditions may be met.

In addition to disabling fuel, selected cylinder valves are deactivated to prevent air from being pumped through the cylinders. Closing of the valves disables flow of air to the exhaust components, and does not allow any oxygen from the air to saturate the after-treatment catalyst. Instead, the cylinders act as an air spring where most of the energy put into the compression stroke is returned in the following blowdown stroke.

Figure 3:
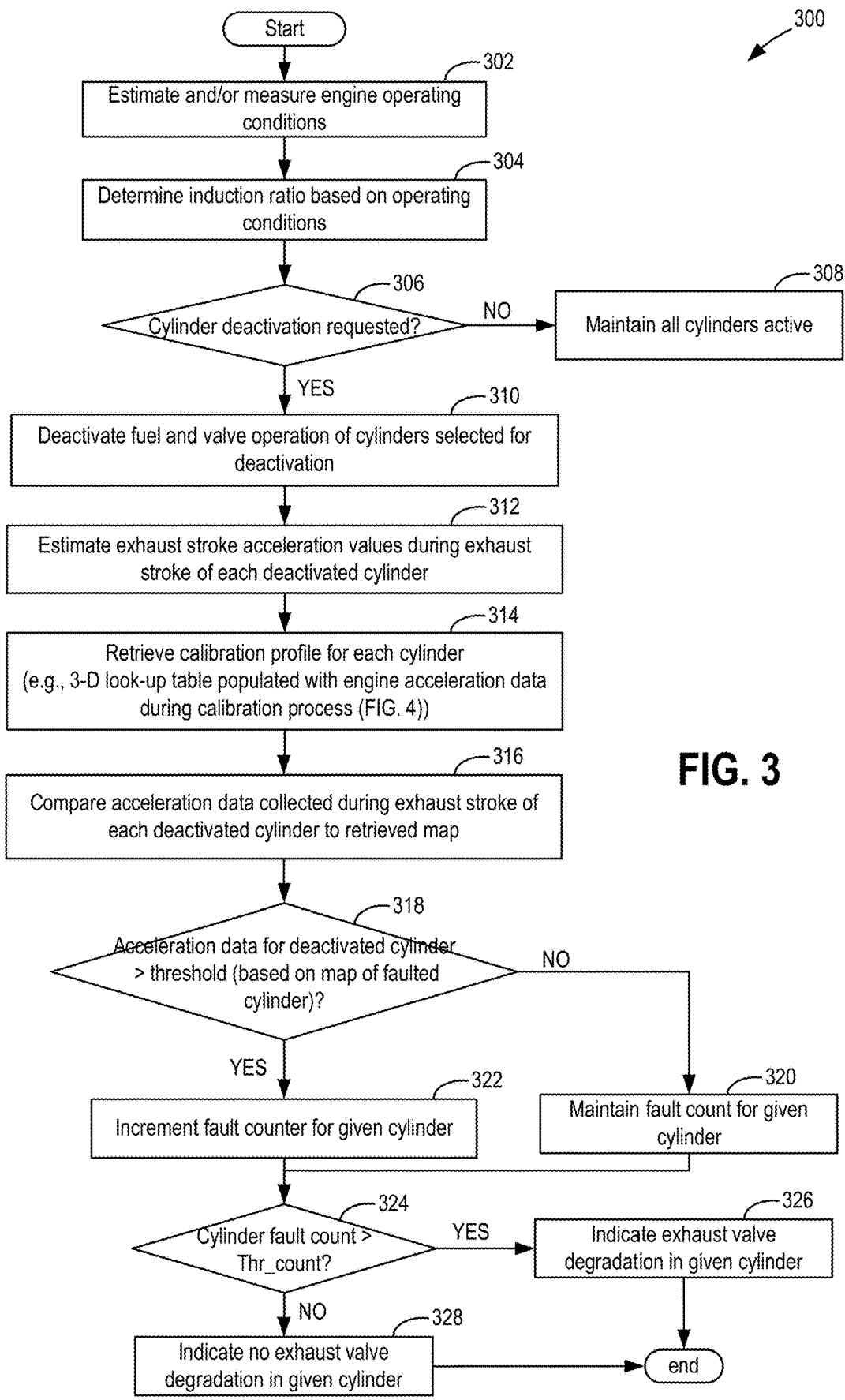
FIG. 3 shows a high level flow chart illustrating an example method for diagnosing degradation of a cylinder exhaust valve deactivation mechanism based on engine acceleration data.

Controller 12 may periodically run a diagnostic routine, such as the example routine of FIG. 3, to diagnose the cylinder valve deactivation mechanism, in particular, the actuator coupled to an exhaust cylinder valve deactivation mechanism. The routine may be executed during a cylinder deactivation event at a cylinder to verify if the exhaust valve remained closed during an exhaust stroke, as commanded to, or if the exhaust valve continued to open during an exhaust stroke. If degradation occurs, and the exhaust valve opens when commanded to close on a cylinder deactivation event, tailpipe emissions may be affected due to oil being pulled past the piston rings during the exhaust stroke of the deactivated cylinder. As elaborated with reference to FIG. 3, the controller may rely on the output of an existing crankshaft position sensor for identifying degradation of exhaust valve deactivation. The controller may compare the acceleration data collected by the sensor during the exhaust stroke of a cylinder that is commanded to deactivated (herein also referred to exhaust acceleration data) with a calibrated map (FIG. 4) to determine if the exhaust valve of the cylinder was closed or open during the exhaust stroke of the cylinder.

Ignition system 188 can provide an ignition spark to combustion chamber 15 via spark plug 192 in response to spark advance signal SA from controller 12, under select operating modes. Though spark ignition components are shown, in some embodiments, combustion chamber 15 or one or more other combustion chambers of engine 10 may be operated in a compression ignition mode, with or without an ignition spark.

Intake passage 144 or intake manifold 146 may include a throttle 162 (which may be throttle 20 of FIG. 1, in one example) having a throttle plate 164. In this particular example, the position of throttle plate 164, or a throttle opening, may be varied by controller 12 via a signal provided to an electric motor or actuator included with throttle 162, a configuration that is commonly referred to as electronic throttle control (ETC). In this manner, throttle 162 may be operated to vary the intake air provided to combustion chamber 15 among other engine cylinders. The position of throttle plate 164 may be provided to controller 12 by throttle position signal TP. Intake passage 142 may include a mass airflow sensor 122 for providing a MAF signal to controller 12, and intake manifold 146 may include a manifold absolute pressure sensor 124 for providing a MAP signal to controller 12.

Engine 10 may further include a compression device such as a turbocharger or supercharger including at least a compressor 174 arranged along intake passage 144. For a turbocharger, compressor 174 may be at least partially driven by a turbine 176 (e.g., via a shaft 180) arranged along an exhaust passage 158. If the engine includes a supercharger, compressor 174 may be at least partially driven by the engine 10 and/or an electric machine, and may not include a turbine. The compression device (e.g., turbocharger or supercharger) allows the amount of compression provided to one or more cylinders of the engine to be varied by controller 12.

In some embodiments, engine 10 may include an exhaust gas recirculation (EGR) system that includes a low pressure (LP) EGR and/or high pressure (HP) EGR passage for recirculating exhaust gas (not shown). One example of an EGR system includes a low pressure (LP) EGR system, where EGR may be routed from downstream of turbine 176 of a turbocharger to upstream of a compressor 174 of the turbocharger. In a high pressure (HP) EGR system, EGR may be routed from upstream of the turbine 176 of the turbocharger to downstream of the compressor 174 passage of the turbocharger. In both the LP and HP EGR systems, the amount of EGR provided to intake manifold 146 may be varied by controller 12 via a respective LP EGR valve and HP EGR valve (not shown). Further, an EGR sensor (not shown) may be arranged within the respective LP EGR passage and/or HP EGR passage, and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust oxygen sensor 128 and/or an intake oxygen sensor (not shown). Under some conditions, the EGR system may be used to regulate the temperature of the air and fuel mixture within the combustion chamber and/or the temperature proximate to a particulate filter 72.

It will be appreciated that in several embodiments, exhaust passage 158 may include a bypass passage 173 with an inlet positioned upstream of the turbine 176. A flow control valve, known as a wastegate valve 172, may be disposed in the bypass passage. By adjustment of the position (e.g., degree of opening) of the wastegate valve 172, the amount of exhaust gas bypassing turbine 176 may be controlled. Position of the wastegate valve may be controlled via a wastegate actuator (not shown, and which may be hydraulic, pneumatic, electric, or mechanical in nature) responding to a signal from controller 12. For example, the controller 12 may receive an operator request to increase engine torque, and may increase boost pressure in order to meet the torque request.

Similarly, it will be appreciated that compressor 174 may include a recirculation passage (not shown) across the compressor. The recirculation passage may be used for recirculating (warm) compressed air from the compressor outlet back to the compressor inlet. In some embodiments, the compressor recirculation system may alternatively, or additionally, include a recirculation passage for recirculating (cooled) compressed air from the compressor outlet, downstream of a charge air cooler (not shown) to the compressor inlet or compressor bypass for dissipating compressed air to atmosphere. A flow control valve, known as a compression recirculation valve (not shown), may be included between the intake passage 142 and the recirculation passage. Depending on position of the wastegate valve, the amount of recirculating intake air may be controlled.

Emission control device (ECD) 70 is shown arranged along exhaust passage 158 downstream of exhaust manifold 148 and downstream of exhaust gas sensor 128. Exhaust gas sensor 128 is shown coupled to exhaust passage 158 upstream of emission control device (ECD) 70. Exhaust gas sensor 128 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In the depicted example, exhaust gas sensor 128 is configured as a UEGO.

ECD 70 includes one or more exhaust catalysts that may include one or more of a three way catalytic converter (TWC), a diesel oxidation catalyst (DOC), a selective catalytic reduction catalyst (SCR), lean NOx trap (LNT), particulate filter, etc.

Controller 12 (which may include controller 12 of FIG. 1) is shown in FIG. 2 as a microcomputer, including microprocessor 106, input/output ports 108, an electronic storage medium (e.g., computer-readable) for executable programs and calibration values shown as read-only memory 110 in this particular example, random access memory 112, keep alive memory 114, and a data bus. Storage medium read-only memory 110 can be programmed with computer readable data representing instructions executable by microprocessor unit 106 for performing the methods described herein, as well as other variants that are anticipated but not specifically listed. As described above, FIG. 2 shows one cylinder of a multi-cylinder engine, and it will be appreciated that each cylinder may similarly include its own set of intake/exhaust valves, fuel injector, spark plug, etc.

Controller 12 may receive various signals from sensors coupled to engine 10, in addition to those signals previously discussed, including a degree of operator-demanded torque from pedal position sensor 134, an air-fuel ratio of exhaust gas from exhaust gas sensor 128. Controller 12 may also receive signals including measurement of inducted mass airflow (MAF) from mass airflow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP), or throttle opening, from a throttle position sensor; and manifold absolute pressure signal, MAP, from pressure sensor 124, which may be used to provide an indication of vacuum, or pressure, in the intake manifold. Engine speed signal, RPM, may be generated by controller 12 from signal PIP. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall Effect sensor 120, which is also used as an engine speed sensor, may produce a predetermined number of equally spaced pulses each and every revolution of the crankshaft. The controller 12 receives signals from the various sensors of FIGS. 1-2 (e.g., EGO sensor 128, pedal position sensor 134, etc.) and employs the various actuators (e.g., throttle plate 164, spark plug 192, fuel injectors 166, 170, valve actuators 152, 154, etc.) of FIGS. 1-2 to adjust engine operation based on the received signals and instructions stored on a memory of the controller.

For example, responsive to a drop in engine torque demand, based on the output of the pedal position sensor, the controller may send a command signal to at least fuel injector 166 to disable delivery of fuel to cylinder 15. Concurrently, the controller may deactivate valves 150, 156 via actuators 152, 154. Then, while the deactivated cylinder is going through (what would have been) an exhaust stroke, the controller may diagnose exhaust valve operation in the deactivated cylinder based on engine acceleration data output by crankshaft position sensor 120.

In this way, the components of FIGS. 1-2 enable an engine system comprising: an engine with a plurality of cylinders having selectively deactivatable fuel injectors and selectively deactivatable intake and exhaust valves; a crankshaft position sensor; a controller with computer readable instructions stored on non-transitory memory that when executed cause the controller to, while torque demand is higher than a threshold, map crankshaft acceleration for each engine cylinder, as engine speed and load changes, with an exhaust valve commanded open and also with the exhaust valve commanded closed; populate a look-up table, stored in the controller's memory as a function of engine speed and load and cylinder identity, with a learned highest difference in acceleration between the crankshaft acceleration mapped with the exhaust valve commanded open relative to the crankshaft acceleration mapped with the exhaust valve commanded closed, and a tooth region of the crankshaft position sensor where the highest difference was learned. The controller may include further instructions to, while torque demand is lower than the threshold, selectively deactivate one or more engine cylinders; and for each deactivated cylinder, sensing crankshaft acceleration over an exhaust stroke; and indicate degradation of exhaust valve operation based on a comparison of the sensed crankshaft acceleration to a threshold value retrieved from the look-up table as a function of cylinder identity and engine speed and load at which the crankshaft acceleration was sensed. As an example, the sensing may include sensing the crankshaft acceleration over the exhaust stroke in the tooth region of the crankshaft position sensor. The controller may include further instructions for incrementing a counter when the sensed crankshaft acceleration exceeds the threshold value; and setting a diagnostic code indicating degraded exhaust valve operation responsive to an output of the counter remaining higher than a threshold count for a duration. Degradation of exhaust valve operation may include the exhaust valve moving to an open position during the exhaust stroke when commanded closed during the selectively deactivating. Additionally, the controller may include further instructions that cause the controller to reactivate one of the one or more selectively deactivated engine cylinders indicated to be deactivated; and maintain the reactivated cylinder active while deactivating another engine cylinder responsive to torque demand lower than the threshold.

Turning now to FIG. 3, an example method 300 is shown for diagnosing the operation of an exhaust valve of a deactivated cylinder in a variable displacement engine using an existing crankshaft position sensor. The method enables the diagnostic to be performed reliably using existing components and sensors. The method relies on comparison of sensed engine crankshaft acceleration data to a map populated with data during a calibration routine, such as elaborated with reference to FIG. 4. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, engine and vehicle operating conditions are estimated and/or measured. These include, for example, engine speed, engine load, operator torque demand, boost pressure, engine temperature, etc. At 304, the method includes determining a target induction ratio based on the estimated engine operating conditions. The induction ratio may be determined as the ratio of active cylinders to total number of cylinders. Thus, an induction ratio of 1.0 implies that all cylinders are desired to be active while an induction ratio of 0.5 implies that half of all cylinders are desired to be active. The controller may refer to a look-up table that outputs the target induction ratio as a function of at least engine speed and load as inputs. In one example, as the engine speed and load decreases, the target induction ratio decreases, although the relationship may not be linear.

In some examples, in addition to determining the target induction ratio, the controller may also output an identity and number of cylinders to deactivate. The selection may be based on current engine operating conditions, cylinder firing order, etc.

At 306, it may be determined if cylinder deactivation has been requested. In one example, a cylinder deactivation request is confirmed if the target induction ratio is less than 1.0. If cylinder deactivation is not requested, such as when the target induction ratio is 1.0, the controller may maintain all engine cylinders active at 308. The engine may then operate with all cylinders firing.

If cylinder deactivation is requested, then at 310, one or more cylinders may be selectively deactivated to provide the requested induction ratio. For example, cylinders may be deactivated in accordance with the number and identity of cylinders identified at 304. Alternatively, the number of cylinders to be selectively deactivated may be determined based on the target induction ratio while the identity of the cylinders to deactivate may be based on cylinder deactivation history and cylinder firing order. For example, if the induction ratio is 0.5, and the engine is a V-engine with 2 banks of cylinders, then the controller may selectively deactivate cylinders of the bank that was not deactivated on a large VDE event (that is, cylinders that remained active on the last VDE event). Selectively deactivating the selected cylinders includes the controller sending a control signal to corresponding cylinder fuel injectors to deactivate fueling. In addition, the controller may send a control signal to corresponding cylinder valve actuators (or cylinder valve deactivation mechanism actuators) to deactivate the intake and the exhaust valve of the cylinders. As a result, the exhaust valve is commanded to stay closed during an exhaust stroke of the deactivated cylinder.

At 312, the method includes estimating exhaust stroke acceleration values during an exhaust stroke of each deactivated cylinder. The exhaust stroke acceleration values includes crankshaft position sensor output collected over the exhaust stroke of each deactivated cylinder. As used herein, the crankshaft acceleration includes determining the difference in speed between particular teeth on the crank wheel. The controller may measure the speed of each tooth and then can choose a window over which to calculate the acceleration. Crank tooth speed is similar to crankshaft speed. In one example, crank position data may be collected from the crank position sensor of the engine at a defined sampling rate. For example, ~8 MHz crank position data may be collected in a 60-2 crank wheel. This gives a reliable velocity of each tooth as it passes the crank position sensor with a resolution of 6 crank degrees. It will be appreciated that while the method describes estimating exhaust stroke acceleration, in other examples, intake stroke acceleration values may be additionally or optionally collected from the crank position sensor over an intake stroke of each deactivated cylinder. For example, a controller may indicate degradation of an intake valve of a selectively deactivated engine cylinder responsive to crankshaft acceleration sensed over an intake stroke of the cylinder.

With reference to the exhaust valve diagnostic routine, the inventors herein have recognized the relationship between crankshaft acceleration and (exhaust) valve operation. The acceleration increases during the exhaust stroke when the exhaust valve is open because there is no compression (in the cylinder). The acceleration decreases during the exhaust stroke because there is compression when the exhaust valve is closed. Additionally, other factors that impact crankshaft acceleration are taken into account by the calibration process to capture all noise factors.

At 314, the method includes retrieving a calibration profile for each cylinder of the engine from the controller's memory. In one example, the calibration profile may be stored in the form of a 3-D look-up table in the controller's memory. The 3-D table may be populated with engine acceleration data collected during an engine calibration routine, as elaborated with reference to FIG. 4. The data may be captured as a function of engine speed and load and cylinder identity. Thus there may be a distinct 3-D map for each engine cylinder covering a range of engine speeds and loads. As elaborated at FIG. 4, the data may be captured while an exhaust valve is open over an exhaust stroke and thus may correspond to the map of degraded or faulted exhaust valve.

At 316, the method includes comparing the acceleration data captured by the crank position sensor during the cylinder deactivation event with the acceleration data in the 3-D map for the corresponding cylinder, retrieved from the controller's memory. For example, the controller may gather continuous data of the exhaust stroke during cylinder deactivation exhaust strokes for each deactivated cylinder and compare them to a 3-D look-up table of values for a degraded exhaust valve for the respective cylinder. At 318, it may be determined if the sampled acceleration data for the deactivated cylinder is higher than a threshold value, the threshold value based on the retrieved map of the corresponding cylinder at the given engine speed and load with a faulted exhaust valve. A sign and direction of the change may be dependent on engine speed and load versus the load set point.

Exhaust valve open/closed during the exhaust is only one factor in determining the crank acceleration during the exhaust stroke. Still other smaller factors that can be accounted for include a preceding power stroke, crankshaft dynamics, accessory loads, and cam positions. These smaller factors may be grouped into effects seen in speed and load.

Alternatively, a difference between the estimated exhaust acceleration value and the mapped exhaust acceleration value may be determined and compared to a threshold based on the mapping. In one example, an absolute difference may be determined. It will be appreciated that a comparison of the sensed acceleration data and the mapped acceleration data may be similarly performed for each cylinder that is deactivated during the VDE mode. An example map that may be used for the comparison is shown with reference to FIG. 7 and described in detail later.

If the difference for any given cylinder is determined to be higher than the threshold, then at 322, the method includes incrementing the count of a fault counter for the given cylinder. For example, the output of a fault counter stored in the controller's memory as a function of the identity of the given cylinder may be incremented by a value of 1. Alternatively, the controller may count up the number of task loops (~10 ms). Therein the controller may count how many task loops for which the exhaust valve is determined to be faulted and may be determined as: count*task=duration.

In addition to monitoring the count, the controller may also monitor a duration over which the count is incremented, or a rate of change in the count. Else, if the difference is not higher than the threshold, then at 320, the current fault count of the counter for the given cylinder may be maintained.

In some examples, a "leaky bucket" methodology can be used to decrement the count or duration/rate based upon the exhaust valve not being failed. For example, the controller may decrement the count of engine cycles where a fault is present when exhaust valve is detected to not be degraded. Then, once the engine cycle degraded count is below a threshold, the controller may begin to decrement the duration counter while the exhaust valve is still detected to be not degraded. The same may be applied for increasing the counts and timers including increasing the count up to a threshold then increasing the duration.

From each of 320 and 322, the method moves to 324 where the fault count for each deactivated cylinder is compared to a threshold count (Thr_count). In one example, the threshold count is a non-zero threshold. In further examples, the controller may determine if the count has been higher than the threshold for a defined duration, such as having a value of 30,000 for 5 mins. It will be appreciated that the controller may set a distinct fault count and fault duration for each cylinder. The controller may accordingly keep a total count of faulted cycles in KAM per cylinder. In one example, the threshold count may be common across all engine cylinders. In other examples, the threshold count for each cylinder may vary. For example, all cylinders may have a default threshold count which is then adjusted based on a cylinder's fault history. For example, if a cylinder has been previously diagnosed with exhaust valve degradation, the threshold count for the given cylinder may be lowered from the default value.

If the output of the counter for a given cylinder is lower than the threshold count, then at 328, the method includes indicating no valve degradation in the selectively deactivated cylinder. Else, if the output of the counter for a given cylinder is higher than the threshold count, then at 326, the method includes indicating degradation of the exhaust valve of the given cylinder. For example, it may be indicated that the exhaust valve opened when it was commanded to remain closed through an exhaust stroke of the cylinder event for the given deactivated cylinder. As another example, it may be indicated that an actuator coupled to a valve deactivation mechanism of the given cylinder's exhaust valve is degraded. It will be appreciated that while the above example shows indicating degradation of an exhaust valve mechanism of a selectively deactivated cylinder responsive to exhaust acceleration data collected via a crank sensor, in other examples, the controller may similarly indicate degradation of an intake valve mechanism of a selectively deactivated cylinder responsive to exhaust acceleration data collected via the crank sensor. The method then exits.

In some examples, responsive to the indication of valve degradation, one or more mitigating actions may be performed. For example, responsive to the indication of exhaust valve degradation during deactivation of a given cylinder, the given cylinder may be reactivated and during future VDE conditions, the given cylinder may be maintained active. That is, future deactivation of the given cylinder with the degraded exhaust valve may be disabled.

Figure 4:
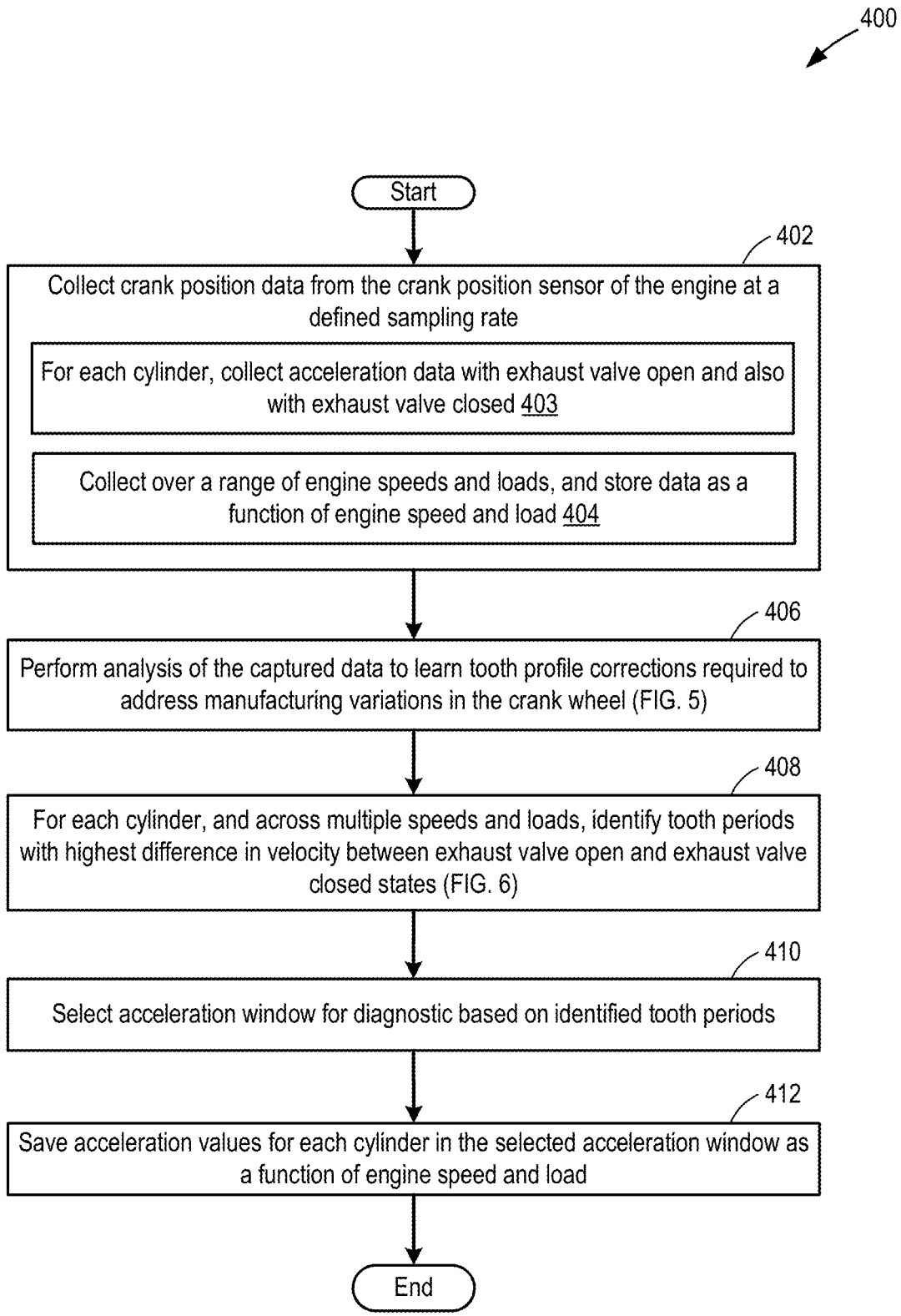
FIG. 4 shows a flow chart illustrating an example method for calibrating engine acceleration data and generating a map that may be used in the method of FIG. 3 for the identification of degradation.

Turning now to FIG. 4, an example method 400 is shown for calibrating engine crank position information, as captured by a crank position sensor coupled to a cylinder crankshaft. The data may be captured and used to populate a look-up table that is referenced by a diagnostic for valve operation of a cylinder during a cylinder deactivation event. In one example, the method of FIG. 4 may be performed as part of the method of FIG. 3, such as at 314.

At 402, the method includes collecting crank position data from the crank position sensor of an engine at a defined sampling rate. In one example, sensor output is collected at ~8 Mhz from the crank position sensor. On a 60-2 crank wheel, this gives reliable velocity of each tooth as it passes the crank position sensor with as resolution of 6 crank degrees. The data may be collected over an exhaust stroke of the cylinder. Collecting the crank position data includes, at 403, for each engine cylinder, collecting acceleration data with the exhaust valve open as well as with the exhaust valve closed. It will be appreciated that while the method of FIG. 4 describes the collection of exhaust acceleration data (that is, crank position data collected over an exhaust stroke of each cylinder), in other examples, the controller may similarly collect intake acceleration data (that is, crank position data collected over an intake stroke of each cylinder). Collecting the data further includes, at 404, collecting crank position data over a range of engine speeds and loads, and storing the data as a function of engine speed and load for each cylinder. For example, crank position data may be collected as the engine speed and load varies over a duration of the calibration procedure. As an example, the controller may collect crank speed data during the exhaust stroke for different speeds and loads for a non-degraded exhaust valve. Then the controller would gather the same data for a degraded exhaust valve. The controller would then select which speeds should be used to calculate crankshaft acceleration based on the speeds which provide largest separation between a non-degraded exhaust valve and a degraded exhaust valve at each speed and load.

At 406, the method includes performing an analysis to learn tooth profile corrections required to address manufacturing variations in the crank wheel. An example analysis is shown with reference to FIG. 5. Therein, tooth period measurements are normalized to correct for variations in tooth width and to support measurement intervals not aligned to PIP edges. Correction factors may include the ratio of a tooth period time to the average tooth period time for the engine cycle centered about the tooth in order to normalize the tooth period measurement times.

Figure 5:
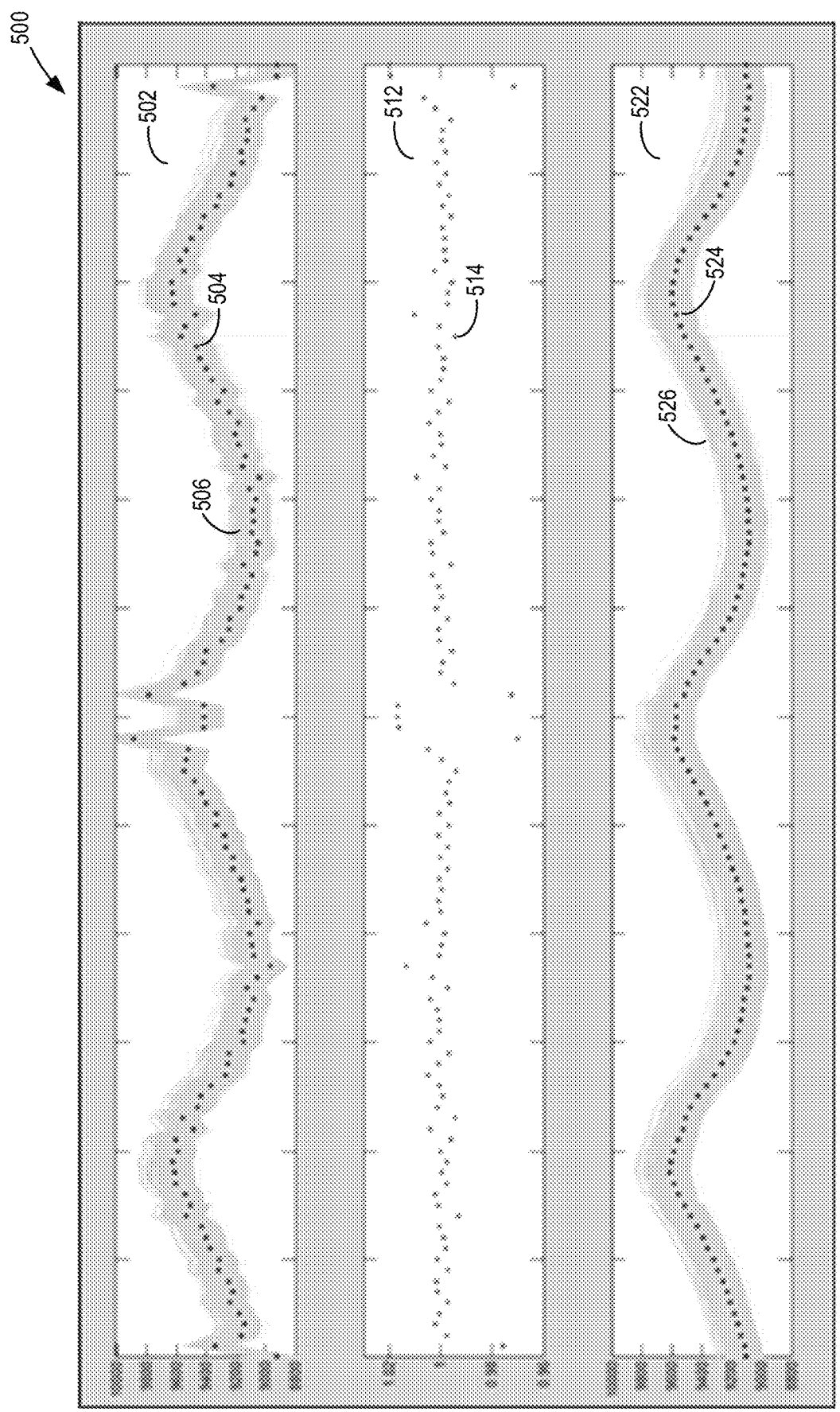
FIG. 5 shows an example of crank sensor tooth profile corrections that may be applied during the calibration method of FIG. 4.

Turning briefly to FIG. 5, map 500 depicts example correction of crank tooth velocity data captured via a crank position sensor for a given cylinder. The data is collected for a 1.0 L I-3 engine on idle with a 60-2 wheel for crankshaft position measurement. Plot 502 depicts tooth period buffer, uncorrected. Tooth period (in hw ticks) is shown along the y-axis and tooth number starting from the missing tooth on Rev 1 is shown on the x-axis. The X-axis is each tooth on the wheel (120 teeth, 6 CAD per tooth). The Y-axis for each plot is the time it took for the tooth to pass the crank position sensor (note that 6 CAD/time per tooth gives the speed of each tooth). Median value per tooth index is shown by data points 504. Region 506 shows a series of lines depicting the composite plot of tooth data (e.g., over ~300 cycles).

Profile correction actors are shown at plot 512 with each circle 514 representing a profile correction factor applied to the corresponding tooth (one correction factor per tooth). Corrected tooth period outputs are shown in plot 522, and the axes are the same as for plot 502.

A crankshaft position sensor input signal is collected with PIP interrupt timing (cpsin_tt) at plot 502, for example, with 1 engine cycle of 720CA. Then, a circular buffer array holds the most recent 1 engine cycle worth of tooth period measurements (720CA assayed at 6 CAD/time=120 elements). This is represented as cpsin_tt_buf(x). Then, one profile correction factor is assigned per tooth over 1 engine cycle (120 cfs). Finally, measurement routines provide profile corrected tooth period times.

Figure 6:
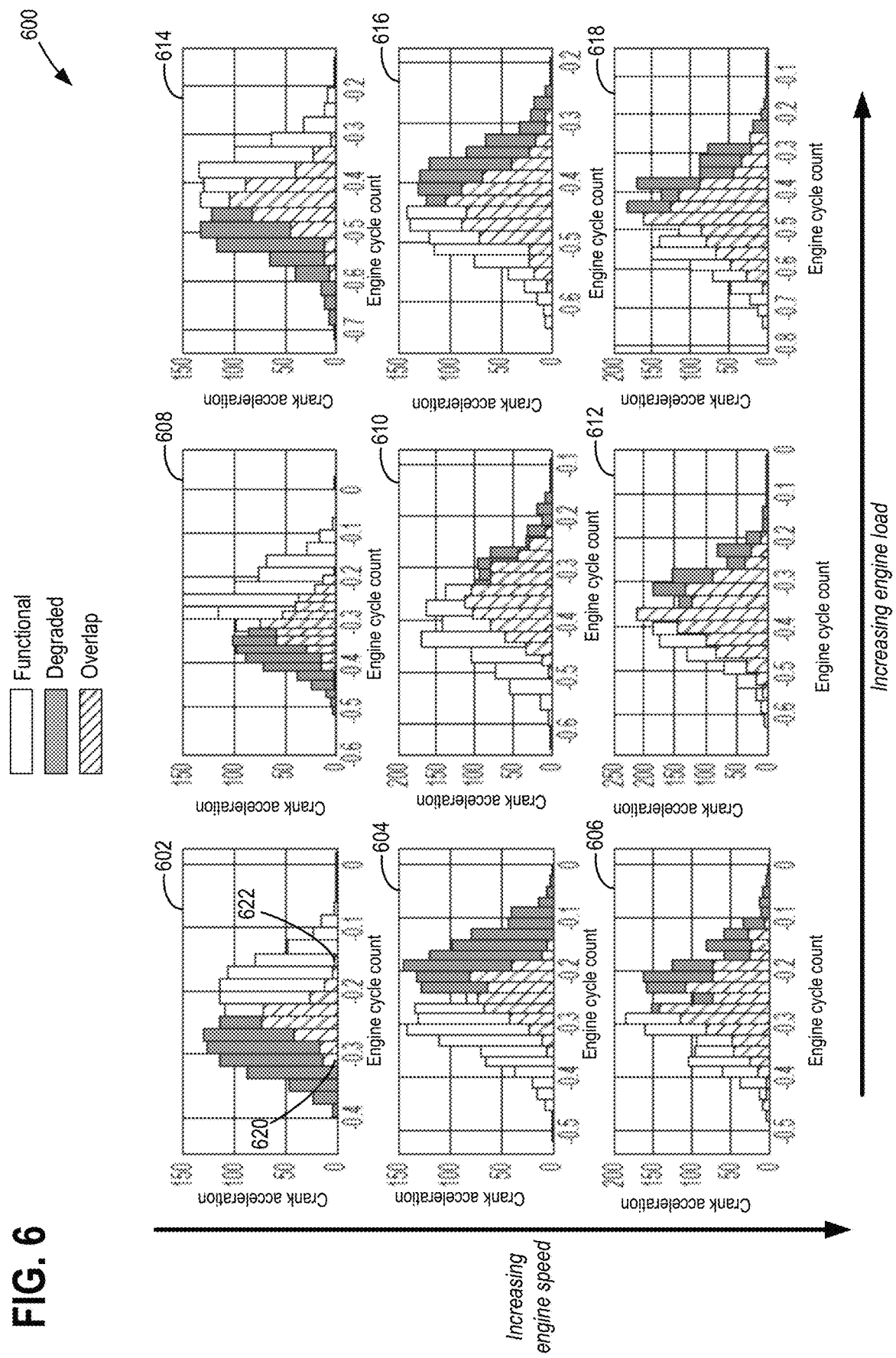
FIG. 6 shows an example comparison of faulted and not faulted acceleration data that may be used for identifying degradation of an exhaust valve mechanism during a cylinder deactivation event.

Returning to FIG. 4, at 408, after correcting the data, the method includes identifying, for a given cylinder, the tooth periods having a highest difference in velocity between exhaust valve open and exhaust valve closed states (or intake valve open and intake valve closed states in the scenario where intake acceleration data was captured) for each engine speed-load setpoint. Herein, the calibration is performed for several data points (e.g., at least more than a threshold number of data points, such as 9 data points) across the engine speed and load table. An example calibration is shown at FIG. 6. At 410, the method includes selecting an acceleration window for a diagnostic of the given cylinder based on the identified tooth periods. At 412, the determined acceleration window and the identified difference in velocities is used to populate a 3-D look-up table. Specifically, the controller may populate a 3-D look-up table stored in the controller's memory with the acceleration values for each cylinder in the selected acceleration window as a function of engine speed and load (and cylinder identity). The method then exits. This concludes the calibration and the calibrated map is stored in the controller's memory and retrieved for use during the execution of a cylinder deactivation valve diagnostic (such as the method of FIG. 3), to identify valve degradation. An example map is shown with reference to FIG. 7 that is populated with the data collected across a range of setpoints at FIG. 6.

It will be appreciated that the calibration performed in the method of FIG. 4 (and the example of FIG. 6) is performed while operating the engine at defined air-fuel ratio, such as at or around stoichiometry. However, in alternate examples, the map may be further adjusted as a function of cylinder air-fuel ratio.

Turning now to FIG. 6, map 600 depicts plots 602-618 wherein each plot represents crank acceleration captured for a given cylinder at a distinct setpoint having a defined engine speed and load (nine setpoints are shown). Each plot is for the same engine cylinder and is for the operation of the same exhaust valve, albeit at different engine speed-load points. Each plot depicts crank acceleration along the y-axis and an engine cycle count along the x-axis. The setpoints for plots 602 to 618 are of gradually increasing engine speed along the vertical direction, and gradually increasing engine load along the horizontal direction. Thus, plots 602, 608, and 614 depict crankshaft acceleration data captured for a cylinder at a first engine speed and at gradually increasing engine loads, plots 604, 610, and 616 depict crankshaft acceleration data captured at a second engine speed (higher than the first engine speed) and at the gradually increasing engine loads, and plots 606, 612, and 618 depict crankshaft acceleration data captured at a third engine speed (higher than the second engine speed) and at the gradually increasing engine loads. Similarly, plots 602, 604, and 606 depict crankshaft acceleration data captured at a first engine load and at gradually increasing engine speeds, plots 608, 610, and 612 depict crankshaft acceleration data captured at a second engine load (higher than the first engine load) and at the gradually increasing engine speeds, and plots 614, 616, and 618 depict crankshaft acceleration data captured at a third engine load (higher than the second engine load) and at the gradually increasing engine speeds.

In each plot, crank acceleration data captured for a given cylinder having a functional exhaust valve (or associated mechanism) is shown by solid white bars, crank acceleration data captured for the given cylinder having a degraded exhaust valve (or associated mechanism) is shown by solid grey bars, and a window wherein the data between the two conditions has the highest difference is shown by hatched bars. In one example, functional valve data corresponds to data captured while an exhaust valve of the cylinder is held closed during an exhaust stroke (thereby mimicking the condition observed during a functional cylinder deactivation event in the given cylinder, wherein the valve remains closed when commanded closed) while degraded valve data corresponds to data captured in the same cylinder while the exhaust valve of the cylinder is held open during an exhaust stroke (thereby mimicking the condition observed during a degraded cylinder deactivation event in the given cylinder, wherein the valve opens when commanded closed).

In one example, the controller may identity the tooth points corresponding to the region having the largest difference between functional and degraded states and use the tooth points to identify a corresponding tooth period to use during a diagnostic for the given cylinder and the given engine speed and load setpoint. As an example, with reference to plot 602, tooth points corresponding to engine cycle counts 620 and 622 may be calculated and used to define a tooth period (corresponding to region 620-622) which has the highest difference in velocities between the functional and degraded states. This data is then used to populate a 3-D look-up table, such as table 700 of FIG. 7. Depending on the crank dynamics of the engine, the calibration process may require one or more 3-D look-up tables per cylinder.

In particular, FIG. 6 shows histograms of engine cycle counts at different speeds and loads of crank acceleration data with a functional and exhaust valve. The distributions are used to determine the median value for the crank acceleration that is seen during the exhaust stroke for a functional or degraded exhaust valve. FIG. 7 shows example median values from FIG. 6 graphs that are used as thresholds to determine a degraded valve. The lowest speeds and loads saw the highest separation between degraded and functional medians. In this strategy, a rolling median is calculated which generally agrees with the median of each respective histogram speed and load.

For example, at the top left graph in FIG. 6 the median acceleration for a degraded exhaust valve is ~0.3 while the median acceleration for a functional exhaust valve is ~0.2. We set a threshold at −0.28 on our rolling median calculation with hysteresis in/out to determine that the exhaust valve is behaving like a degraded exhaust valve instead of a functional exhaust valve. The degradation is stored at that low speed low load part of a 3-d map and the algorithm continues to look at the other crank acceleration data to determine if they are seeing similar degraded exhaust valve behavior in the crank acceleration signal.

In this way, accurate and reliable valve diagnostics can be implemented for an engine configured with selective cylinder deactivation capabilities. The technical effect of correlating crank position data captured during an exhaust stroke of a deactivated cylinder with valve functionality is that exhaust valve diagnostics can be executed in the VDE engine using existing sensors, reducing the reliance on expensive valve position sensors or exhaust pressure sensors. The approach can be similarly applied to correlate intake stroke crankshaft acceleration with intake valve operation during a cylinder deactivation event. This allows diagnostic costs to be reduced without compromising diagnostic accuracy. By timely identifying and mitigating degradation in exhaust valve operation during a cylinder deactivation event, exhaust emissions quality may be improved.

One example method comprises: indicating degradation of an exhaust valve of a selectively deactivated engine cylinder responsive to crankshaft acceleration sensed over an exhaust stroke of the cylinder. In the preceding example, additionally or optionally, indicating degradation includes indicating that the exhaust valve is open when commanded closed during a deactivation event of the cylinder. In any or all of the preceding examples, additionally or optionally, indicating degradation of the exhaust valve includes indicating that an actuator coupled to a deactivation mechanism of the exhaust valve is degraded. In any or all of the preceding examples, additionally or optionally, the crankshaft acceleration is sensed via a crankshaft position sensor. In any or all of the preceding examples, additionally or optionally, the sensed crankshaft acceleration is sensed at an engine speed and load, and wherein indicating responsive to the crankshaft acceleration includes comparing the sensed crankshaft acceleration over the exhaust stroke of the cylinder to a calibrated acceleration, mapped at the engine speed and load with the exhaust valve commanded open. In any or all of the preceding examples, additionally or optionally, the indicating further includes indicating that the exhaust valve is degraded when a difference between the sensed crankshaft acceleration and the calibrated acceleration is higher than a threshold difference. In any or all of the preceding examples, additionally or optionally, the threshold difference is a function of the engine speed and load. In any or all of the preceding examples, additionally or optionally, the indicating further includes indicating that the exhaust valve is degraded when a difference between the sensed crankshaft acceleration and the calibrated acceleration remains higher than a threshold difference for a duration. In any or all of the preceding examples, additionally or optionally, the method further comprises, responsive to the indicating, reactivating the cylinder and maintaining the cylinder active while deactivating another engine cylinder selective cylinder deactivation conditions are subsequently met.

Another example method for a variable displacement engine comprises, responsive to a drop in torque demand, deactivating fuel and valve operation of a cylinder, while maintaining another engine cylinder active; continuously sensing crankshaft acceleration during an exhaust stroke of the deactivated cylinder; and indicating degradation of exhaust valve operation of the deactivated cylinder based on the sensed crankshaft acceleration relative to a mapped acceleration. In any or all of the preceding examples, additionally or optionally, the method further comprises mapping crankshaft acceleration including: comparing a first map of crankshaft acceleration of the cylinder mapped over a range of engine speeds and loads with the exhaust valve commanded open to a second map of the crankshaft acceleration mapped over the range of engine speeds and loads with the exhaust valve commanded closed; and identifying a crankshaft sensor tooth region having a largest difference in crankshaft acceleration between the first map and the second map. In any or all of the preceding examples, additionally or optionally, the method further comprises populating a look-up table with the largest difference, the look-up table populated as a function of cylinder identity, and engine speed and load. In any or all of the preceding examples, additionally or optionally, indicating degradation of exhaust valve operation of the deactivated cylinder based on the sensed crankshaft acceleration relative to the mapped acceleration includes comparing the sensed crankshaft acceleration to a value from the look-up table, the value retrieved based on engine speed and load at a time of the sensing the crankshaft acceleration. In any or all of the preceding examples, additionally or optionally, the indicating includes incrementing a counter when a difference between the sensed crankshaft acceleration and the mapped crankshaft acceleration exceeds a threshold; and indicating that the exhaust valve operation is degraded, including the exhaust valve is open when commanded closed, responsive to an output of the counter exceeding a threshold count.

Another example engine system comprises an engine with a plurality of cylinders having selectively deactivatable fuel injectors and selectively deactivatable intake and exhaust valves; a crankshaft position sensor; a controller with computer readable instructions stored on non-transitory memory that when executed cause the controller to: while torque demand is higher than a threshold, map crankshaft acceleration for each engine cylinder, as engine speed and load changes, with an exhaust valve commanded open and also with the exhaust valve commanded closed; and populate a look-up table, stored in the controller's memory as a function of engine speed and load and cylinder identity, with a learned highest difference in acceleration between the crankshaft acceleration mapped with the exhaust valve commanded open relative to the crankshaft acceleration mapped with the exhaust valve commanded closed, and a tooth region of the crankshaft position sensor where the highest difference was learned. In any or all of the preceding examples, additionally or optionally, the controller includes further instructions to, while torque demand is lower than the threshold, selectively deactivating one or more engine cylinders; and for each deactivated cylinder, sense crankshaft acceleration over an exhaust stroke; and indicate degradation of exhaust valve operation based on a comparison of the sensed crankshaft acceleration to a threshold value retrieved from the look-up table as a function of cylinder identity and engine speed and load at which the crankshaft acceleration was sensed. In any or all of the preceding examples, additionally or optionally, the sensing includes sensing the crankshaft acceleration over the exhaust stroke in the tooth region of the crankshaft position sensor. In any or all of the preceding examples, additionally or optionally, the controller includes further instructions to increment a counter when the sensed crankshaft acceleration exceeds the threshold value; and set a diagnostic code indicating degraded exhaust valve operation responsive to an output of the counter remaining higher than a threshold count for a duration. In any or all of the preceding examples, additionally or optionally, degradation of exhaust valve operation includes the exhaust valve moving to an open position during the exhaust stroke when commanded closed during the selectively deactivating. In any or all of the preceding examples, additionally or optionally, the controller includes further instructions that cause the controller to reactivate one of the one or more selectively deactivated engine cylinders indicated to be deactivated; and maintain the reactivated cylinder active while deactivating another engine cylinder responsive to torque demand lower than the threshold.

In a further representation, the engine system is coupled to a hybrid vehicle system or an autonomous vehicle system. In another representation, a controller may indicate degradation of an intake valve of a selectively deactivated engine cylinder responsive to crankshaft acceleration sensed over an intake stroke of the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   indicating degradation of an exhaust valve of a selectively deactivated engine cylinder selected from a plurality of active engine cylinders responsive to a crankshaft acceleration sensed over an exhaust stroke of the selectively deactivated cylinder.

2. The method of claim 1, wherein indicating degradation includes indicating that the exhaust valve is open when commanded closed during a deactivation event of the selectively deactivated cylinder.

3. The method of claim 1, wherein indicating degradation of the exhaust valve includes indicating that an actuator coupled to a deactivation mechanism of the exhaust valve is degraded.

4. The method of claim 1, wherein the crankshaft acceleration is sensed via a crankshaft position sensor.

5. The method of claim 1, wherein the crankshaft acceleration is sensed at an engine speed and an engine load, and wherein indicating responsive to the crankshaft acceleration includes comparing the crankshaft acceleration sensed over the exhaust stroke of the selectively deactivated cylinder to a calibrated acceleration, mapped at the engine speed and the engine load with the exhaust valve commanded open.

6. The method of claim 5, wherein the indicating further includes indicating that the exhaust valve is degraded when a difference between the crankshaft acceleration sensed over the exhaust stroke and the calibrated acceleration is higher than a threshold difference.

7. The method of claim 6, wherein the threshold difference is a function of the engine speed and the engine load.

8. The method of claim 5, wherein the indicating further includes indicating that the exhaust valve is degraded when a difference between the crankshaft acceleration sensed over the exhaust stroke and the calibrated acceleration remains higher than a threshold difference for a duration.

9. The method of claim 1, further comprising, responsive to the indicating, reactivating the selectively deactivated cylinder and maintaining the selectively deactivated cylinder active while deactivating another, different engine cylinder of the plurality of active engine cylinders.

10. A method for a variable displacement engine, comprising:
    responsive to a drop in torque demand, deactivating fuel and valve operation of a deactivated cylinder, while maintaining another engine cylinder active;
    continuously sensing crankshaft acceleration during an exhaust stroke of the deactivated cylinder; and
    indicating degradation of exhaust valve operation of the deactivated cylinder based on the sensed crankshaft acceleration relative to a mapped acceleration.

11. The method of claim 10, further comprising mapping crankshaft acceleration including:
    comparing a first map of crankshaft acceleration of the deactivated cylinder mapped over a range of engine speeds and loads with the exhaust valve commanded open to a second map of crankshaft acceleration mapped over the range of engine speeds and loads with the exhaust valve commanded closed; and
    identifying a crankshaft sensor tooth region having a largest difference in crankshaft acceleration between the first map and the second map.

12. The method of claim 11, further comprising populating a look-up table with the largest difference, the look-up table populated as a function of cylinder identity and engine speed and load.

13. The method of claim 12, wherein indicating degradation of exhaust valve operation of the deactivated cylinder based on the sensed crankshaft acceleration relative to a mapped acceleration includes comparing the sensed crankshaft acceleration to a value from the look-up table, the value retrieved based on engine speed and load at a time of the sensing the crankshaft acceleration.

14. The method of claim 10, wherein the indicating includes:
incrementing a counter when a difference between the sensed crankshaft acceleration and the mapped crankshaft acceleration exceeds a threshold; and
indicating that the exhaust valve operation is degraded, including the exhaust valve being open when commanded closed, responsive to an output of the counter exceeding a threshold count.

15. An engine system, comprising:
an engine with a plurality of cylinders having selectively deactivatable fuel injectors and selectively deactivatable intake and exhaust valves;
a crankshaft position sensor; and
a controller with computer readable instructions stored on non-transitory memory that when executed cause the controller to:
while torque demand is higher than a threshold, map crankshaft acceleration for each engine cylinder, as engine speed and load changes, with an exhaust valve commanded open and also with the exhaust valve commanded closed; and
populate a look-up table, stored in the non-transitory memory as a function of engine speed and load and cylinder identity, with a learned highest difference in acceleration between the crankshaft acceleration mapped with the exhaust valve commanded open relative to the crankshaft acceleration mapped with the exhaust valve commanded closed, and a tooth region of the crankshaft position sensor where a highest difference was learned.

16. The system of claim 15, wherein the controller includes further instructions to:
while torque demand is lower than the threshold, selectively deactivating one or more engine cylinders; and
for each deactivated cylinder,
sense crankshaft acceleration over an exhaust stroke; and
indicate degradation of exhaust valve operation based on a comparison of the sensed crankshaft acceleration to a threshold value retrieved from the look-up table as a function of cylinder identity and engine speed and load at which the crankshaft acceleration was sensed.

17. The system of claim 16, wherein the sensed crankshaft acceleration is sensed during the exhaust stroke in the tooth region of the crankshaft position sensor.

18. The system of claim 16, wherein the controller includes further instructions to:
increment a counter when the sensed crankshaft acceleration exceeds the threshold value; and
set a diagnostic code indicating degraded exhaust valve operation responsive to an output of the counter remaining higher than a threshold count for a duration.

19. The system of claim 16, wherein degradation of exhaust valve operation includes the exhaust valve moving to an open position during the exhaust stroke when commanded closed during the selectively deactivating.

20. The system of claim 16, wherein the controller includes further instructions that cause the controller to:
reactivate one of the one or more selectively deactivated engine cylinders indicated to be deactivated; and
maintain the reactivated cylinder active while deactivating another engine cylinder responsive to torque demand lower than the threshold.

* * * * *